United States Patent
Komatsu

(10) Patent No.: US 6,987,541 B2
(45) Date of Patent: Jan. 17, 2006

(54) VIDEO SIGNAL PROCESSING CIRCUIT THAT CAN CORRESPOND TO A PLURALITY OF TELEVISION SIGNAL METHODS

(75) Inventor: Yoshikazu Komatsu, Tokyo (JP)

(73) Assignee: NEC Electronics Corporation, Kawasaki (JP)

(*) Notice: Subject to any disclaimer, the term of this patent is extended or adjusted under 35 U.S.C. 154(b) by 538 days.

(21) Appl. No.: 10/013,821

(22) Filed: Dec. 11, 2001

(65) Prior Publication Data
US 2002/0089604 A1   Jul. 11, 2002

(30) Foreign Application Priority Data
Dec. 12, 2000   (JP)   ............................. 2000-378109

(51) Int. Cl.
H04N 9/68   (2006.01)
H04N 9/64   (2006.01)

(52) U.S. Cl. ............... 348/555; 348/557; 348/724; 348/642; 348/644

(58) Field of Classification Search ............... 348/555, 348/554, 557, 558, 642, 644, 645, 630, 635, 348/705, 706, 718, 715, 724, 536, 537; 332/149, 332/150, 155; 375/320, 321, 327, 328
See application file for complete search history.

(56) References Cited

U.S. PATENT DOCUMENTS

| 3,990,104 | A | * | 11/1976 | Kormann et al. | ........... 348/644 |
| 4,233,622 | A | * | 11/1980 | Groeneweg | ................. 348/557 |
| 4,240,102 | A | * | 12/1980 | Groeneweg | ................. 348/558 |
| 4,403,255 | A | * | 9/1983 | Schiff | ......................... 348/724 |
| 4,438,451 | A | * | 3/1984 | Hinn et al. | ................. 348/557 |
| 4,500,920 | A | * | 2/1985 | Ohyama et al. | ............ 348/181 |
| 4,757,390 | A | | 7/1988 | Mehrgardt et al. | |
| 4,766,484 | A | * | 8/1988 | Clayton et al. | ............. 348/557 |

(Continued)

FOREIGN PATENT DOCUMENTS

DE   41 27 813   2/1993

(Continued)

OTHER PUBLICATIONS

European Search Report dated Aug. 26, 2004.

(Continued)

*Primary Examiner*—John Miller
*Assistant Examiner*—Jean W. Désir
(74) *Attorney, Agent, or Firm*—Katten Muchin Rosenman LLP

(57) ABSTRACT

A video signal processing circuit. includes: a bell table, a first switch, a carrier generating unit, a second switch and a calculation processing unit. The bell table inputs a color difference signal to output a modulation signal having an amplitude defined by the SECAM Standard of the color difference signal. The first switch selects one of the color difference signal and the modulation signal to output a first signal. The carrier generating unit inputs the color difference signal to generate a carrier signal having a frequency defined by the SECAM Standard of the color difference signal. The second switch selects one of the carrier signal and a carrier signal having frequency defined by the PAL Standard and/or the NTSC Standard to output a second signal. The calculation processing unit calculates the first and second signals to output a color difference modulation signal.

19 Claims, 9 Drawing Sheets

U.S. PATENT DOCUMENTS

| | | | |
|---|---|---|---|
| 5,001,549 A * | 3/1991 | Holmbo et al. | 348/182 |
| 5,119,177 A * | 6/1992 | Lim | 348/557 |
| 5,159,435 A * | 10/1992 | Holmbo et al. | 348/718 |
| 5,272,454 A | 12/1993 | Ikai et al. | |
| 5,390,213 A | 2/1995 | O'Donnell | |
| 5,663,768 A * | 9/1997 | Yang | 348/557 |
| 5,953,072 A * | 9/1999 | Lim | 348/555 |
| 6,483,553 B1 * | 11/2002 | Jung | 348/731 |
| 6,525,781 B1 * | 2/2003 | Runstadler | 348/642 |

FOREIGN PATENT DOCUMENTS

| | | |
|---|---|---|
| EP | 0 245 532 | 11/1987 |
| EP | 0 597 160 | 5/1994 |
| EP | 0 606 784 | 7/1994 |
| JP | 01-152893 | 6/1989 |
| JP | 06-046462 | 2/1994 |

OTHER PUBLICATIONS

Alrutz H. et al. A Single Chip Multistandard Video Encoder. IEEE Transactions on Consumer Electronics vol. 39 No. 3 Aug. 30, 1993 pp. 581-586.

Drude S. Digitaler Encoder Zur Erzeugung Von Pal-Und NTSC-Videosignalen. NTZ Nachrichten Technische Zeitschrift vol. 46 No. 3 Mar. 30, 1993 pp. 186-194.

Cummins T. et al. A PAL/NTSC Digital Video Encoder on 0.6-$\mu$m CMOS with 66 dB Typical SNR, 0.4% Differential Gain, and 0.2° Differential Phase. IEEE Journal of Solid-State Circuits vol. 32, No. 7 Jul. 30, 1997 pp. 1091-1100.

* cited by examiner

VIDEO SIGNAL PROCESSING CIRCUIT THAT CAN CORRESPOND TO A PLURALITY OF TELEVISION SIGNAL METHODS

BACKGROUND OF THE INVENTION

1. Field of the Invention

The present invention relates to a video signal processing circuit that can correspond to a plurality of television signal methods, which can generate a video signal where a signal format of television signal methods based on a SECAM Standard, a PAL Standard and/or an NTSC Standard is set.

2. Description of the Related Art

The SECAM Standard, the PAL Standard and the NTSC Standard are used as an analog television signal method. A specification corresponding to the SECAM Standard is set for a television receiver installed in a broadcast area of the SECAM Standard. A specification corresponding to the PAL Standard is set for a television receiver installed in a broadcast area of the PAL Standard. And, a specification corresponding to the NTSC Standard is set for a television receiver installed in a broadcast area of the NTSC Standard.

In recent years, a television broadcast based on a digital television signal method using a so-called MPEG method different from the analog television signal method has been actually used. The analog type television receiver corresponding to only the analog television signal method can not execute a reproduction based on the digital television signal method.

In the case of the execution of the reproduction based on the digital television signal, the digital type television receiver is used which corresponds to the digital television signal method. Also, since a converter (set top box) for converting the digital television signal into the analog television signal is installed on an input side of the analog type television receiver, the reproduction can be executed on the basis of the digital television signal through the analog type television receiver.

As the converter for converting the digital television signal into the analog television signal, the dedicated converter is prepared on the basis of the television signal method installed for the analog type television receiver. A converter for converting the digital television signal into the SECAM Standard of the analog television signal is used for the SECAM Standard of the analog type television receiver. A converter for converting the digital television signal into the PAL Standard of the analog television signal is used for the PAL Standard of the analog type television receiver. And, a converter for converting the digital television signal into the NTSC Standard of the analog television signal is used for the NTSC Standard of the analog type television receiver.

On the other hand, a color difference signal, on which a frequency modulation based on a frequency correlated for each level of the color difference signal that is one of base band signals is performed, is transmitted in the SECAM Standard. The level of the color difference signal and the frequency to be modulated are proportional to each other, as defined in accordance with a signal standard of the SECAM Standard. That is, as the level of the color difference signal is shifted from a low level to a high level, the frequency when the frequency modulation is done is proportionally increased. As for the relation between the level of the color difference signal and a color saturation, a color of a low color saturation and an achromatic color are assigned to a portion close to a center of the level. As the level of the color difference signal is increased or decreased from the center, a color of a high color saturation is assigned. In short, the SECAM Standard always includes a carrier signal containing the color of the low color saturation and the achromatic color (white and black portions). In the SECAM Standard, this inclusion brings about the occurrence of a dot interference on a receiving side, namely, a cross talk phenomenon of a carrier signal to a brightness signal. This occurrence causes the picture to be disgraceful as compared with the PAL Standard and the NTSC Standard. In the SECAM Standard, in order to avoid this disgracefulness, a transmitting side drops a signal amplitude in the vicinity of the achromatic color, for the color difference signal after the frequency modulation. Actually, a so-called bell filter is used as described below. That is, it outputs a signal, in which an amplitude of the color difference signal after the execution of the frequency modulation in the vicinity of the achromatic color is attenuated, with respect to the color difference signal (having a constant amplitude) after the execution of the frequency modulation in the vicinity of the achromatic color, when the color difference signal (having the constant amplitude) where the frequency modulation is performed on the basis of the level of the color difference signal is inputted. This signal process using the bell filter reduces the amplitude (strength) of the color difference signal after the execution of the frequency modulation in the vicinity of the achromatic color having the outstanding dot interference. Thus, this can reduce the influence on the brightness signal caused by the color difference signal in the vicinity of the achromatic color and thereby suppress the dot interference.

FIG. 8 shows a characteristic graph of the bell filter. A horizontal axis of FIG. 8 indicates a frequency, and a vertical axis thereof indicates a gain. A curve indicated by this characteristic graph is generated on the basis of the following equations:

$$G=M_0(1+j16F)/(1+j1.26F)$$

$$F=f/f_0-f_0/f(f_0=4.286 \text{ MHz})$$

Here, f is a frequency, and $M_0$ is a level of 23% of a peak white. In FIG. 8, a range from 3.906 MHz to 4.697 MHz is assigned as the frequency. However, this increase In the frequency is established such that it has a relation proportional to the level of the color difference signal that is one of the base band signals. In FIG. 8, a gain G is minimum at f=4.286 MHz. It is established that the gain G is attenuated with this frequency, namely, the level of the color difference signal corresponding to the achromatic color as a center. In this way, the bell filter corrects the color difference signal (having the constant amplitude) after the execution of the frequency modulation, to an amplitude determined for each frequency.

The bell filter can be constituted by a digital filter (FIR filter) having logical elements. FIG. 9 is a conceptual view around a conventional bell filter. An input signal Input shown in FIG. 9 represents a base band signal indicated by a first function F1. This base band signal and a frequency modulation carrier indicated by a second function F2 are synthesized to accordingly generate a frequency modulation signal Indicated by a third function F3. As the frequency modulation signal, a bell filter having a bell property indicated by a fourth function F4 generates a frequency modulation signal having a bell property indicated by a fifth function F5, namely, a property frequency signal (output signal Output).

As shown in FIG. 9. a bell filter BF is provided with 8 10-bit multipliers, 14 adders, 15 D-flip-flops and one coefficient unit (1/64). Fixed values (control signals) C0 to C7 are sent to the adders.

Japanese Laid Open Patent Application (JP-A-Heisei 1-152893) discloses a method of generating a color signal based on a next SECAM Standard by using a digital process. This method of generating the color signal based on the SECAM Standard by using the digital process has the following feature. That is, a Y signal, an R-Y signal and a B-Y signal are stored at a digital value, on which a pre-emphasis is performed, in a memory. The R-Y signal and the B-Y signal which are read out from the memory becomes conversion outputs on which a digital FM conversion and a sine wave conversion are performed. The Y signal read out from the memory is added to the conversion output. Then, the added outputs are converted from the digital to the analog. Accordingly, the analog color signal based on the SECAM Standard is taken out.

In the case of the video signal processing circuits of the PAL Standard and the NTSC Standard, the common usage between both the circuits is easy in that they use an AM signal. However, in the case of the video signal processing circuit of the SECAM Standard, the common usage between it and the video signal processing circuits of the PAL Standard and the NTSC Standard is difficult in that it uses an FM signal.

Also, if the bell filter is constituted by the FIR filter, the configuration of the circuit becomes large and complex. One of the reasons why the configuration of the circuit becomes large and complex is that it requires a digital filter of a high order (for example, 13 to 20 taps).

SUMMARY OF THE INVENTION

The present invention is accomplished in view of the above mentioned problems.

An object of the present invention is to provide a video signal processing circuit which can correspond to any of the PAL Standard, the NTSC Standard and the SECAM Standard and does not require the high order digital filter.

In order to achieve an aspect of the present invention, a video signal processing circuit, includes: a bell table inputting a color difference signal to output a modulation signal having an amplitude defined by the SECAM Standard of the color difference signal; a first switch selecting one of the color difference signal and the modulation signal to output a first signal; a carrier generating unit inputting the color difference signal to generate a carrier signal having a frequency defined by the SECAM Standard of the color difference signal; a second switch selecting one of the carrier signal and a carrier signal having frequency defined by the PAL Standard and/or the NTSC Standard to output a second signal; and a calculation processing unit calculating the first and second signals to output a color difference modulation signal.

In this case, the carrier generating unit includes a loop counter and a sine ROM.

Also in this case, the loop counter is reset at a start point of a scanning line in response to a line reset signal.

Further in this case, the carrier generating unit includes a phase unit, and wherein the phase unit inverts an output of the loop counter every three scanning lines, when the color difference modulation signal of the SECAM Standard is generated.

In this case, the carrier generating unit includes a phase unit, and wherein the phase unit inverts an output of the loop counter every three scanning lines, when the color difference modulation signal of the SECAM Standard is generated.

Also In this case, the bell table stores frequency data corresponding to the frequency of the carrier signal defined by the SECAM Standard of the color difference signal and amplitude data corresponding to the amplitude of the color difference modulation signal of the SECAM Standard.

Further in this case, the bell table stores frequency data corresponding to the frequency of the carrier signal defined by the SECAM Standard of the color difference signal and amplitude data corresponding to the amplitude of the color difference modulation signal of the SECAM Standard.

In this case, the bell table stores frequency data corresponding to the frequency of the carrier signal defined by the SECAM Standard of the color difference signal and amplitude data corresponding to the amplitude of the color difference modulation signal of the SECAM Standard.

Also in this case, an operational frequency of the loop counter is set to be equal to an integer multiple of 13.5 MHz or 13.5 MHz.

Further in this case, the video signal processing circuit, further includes: a color signal pre-processing unit generating a deviation signal indicative of a frequency deviation of the SECAM Standard from the (R-Y) signal and the (B-Y) signal included in an input signal of the SECAM Standard inputted in the bell table and the carrier generating unit, and wherein when the (R-Y) signal and the (B-Y) signal are based on the ITU-BT.601 standard, the color signal pre-processing unit performs a multiplication of 0.416 times on the (R-Y) signal and a multiplication of −0.506 times on the (B-Y) signal and an offset setting on the (R-Y) signal and the (B-Y) signal.

In this case, the video signal processing circuit, further includes: a color signal pre-processing unit generating a deviation signal indicative of a frequency deviation of the SECAM Standard from the (R-Y) signal and the (B-Y) signal included in an input signal of the SECAM Standard inputted in the bell table and the carrier generating unit, and wherein when the (R-Y) signal and the (B-Y) signal are based on the ITU-BT.601 standard, the color signal pre-processing unit performs a multiplication of 0.416 times on the (R-Y) signal and a multiplication of −0.506 times on the (B-Y) signal and an offset setting on the (R-Y) signal and the (B-Y) signal.

Also in this case, the video signal processing circuit, further includes: a color signal pre-processing unit generating a deviation signal indicative of a frequency deviation of the SECAM Standard from the (R-Y) signal and the (B-Y) signal included in an input signal of the SECAM Standard inputted in the bell table and the carrier generating unit, and wherein when the (R-Y) signal and the (B-Y) signal are based on the ITU-BT.601 standard, the color signal pre-processing unit performs a multiplication of 0.416 times on the (R-Y) signal and a multiplication of −0.506 times on the (B-Y) signal and an offset setting on the (R-Y) signal and the (B-Y) signal.

Further in this case, the video signal processing circuit, further includes: a color signal pre-processing unit generating a deviation signal indicative of a frequency deviation of the SECAM Standard from the (R-Y) signal and the (B-Y) signal included in an input signal of the SECAM Standard inputted in the bell table and the carrier generating unit, and wherein when the (R-Y) signal and the (B-Y) signal are based on the ITU-BT.601 standard, the color signal pre-processing unit performs a multiplication of 0.416 times on the (R-Y) signal and a multiplication of −0.506 times on the (B-Y) signal and an offset setting on the (R-Y) signal and the (B-Y) signal.

In this case, a data width on an input side of the bell table is set to be equal to or greater than 8 bits, and a data width on an output side of the bell table is set to be equal to or greater than 8 bits.

In order to achieve another aspect of the present invention, a video signal processing circuit, includes: an amplitude control unit generating a first signal having an amplitude corresponding to an inputted base band signal; a carrier signal generating unit generating a carrier signal having a frequency corresponding to the base band signal; a modulator calculating the first signal and the carrier signal to modulate the base band signal; and a type selector controlling a correspondence setting of the amplitude in the amplitude control unit and a correspondence setting of the frequency in the carrier signal generating unit.

In this case, the amplitude control unit generates the first signal having one of the amplitude corresponding to a level of the base band signal and the amplitude identical to the level, and wherein the carrier signal generating unit generates the carrier signal having one of the frequency corresponding to a level of the base band signal and a constant frequency.

Also in this case, the correspondence between the level of the base band signal and the amplitude of the first signal in the amplitude control unit and the correspondence between the level of the base band signal and the frequency of the carrier signal in the carrier signal generating unit have a relation defined by the SECAM Standard, and the constant frequency in the carrier signal generating unit is a frequency defined by the PAL Standard or the NTSC Standard.

Further in this case, the type selector selects one of a first state that the amplitude control unit outputs the first signal having the amplitude defined by the SECAM Standard and the carrier signal generating unit outputs the carrier signal having the frequency defined by the SECAM Standard and a second state that the amplitude control unit outputs the first signal having a same amplitude as the level of the base band signal and the carrier signal generating unit outputs the carrier signal having a frequency defined by the PAL Standard or the NTSC Standard.

In this case, the base band signal is a color difference signal.

Also in this case, the amplitude control unit includes a bell table which stores amplitude data corresponding to an amplitude of a color difference modulation signal defined by the SECAM Standard of a color difference signal and frequency data corresponding to a frequency of a carrier signal defined by the SECAM Standard of the color difference signal.

DESCRIPTION OF THE PREFERRED EMBODIMENTS

An embodiment of a consumable item providing system of the present invention will be described below with reference to the attached drawings.

Figure 1:
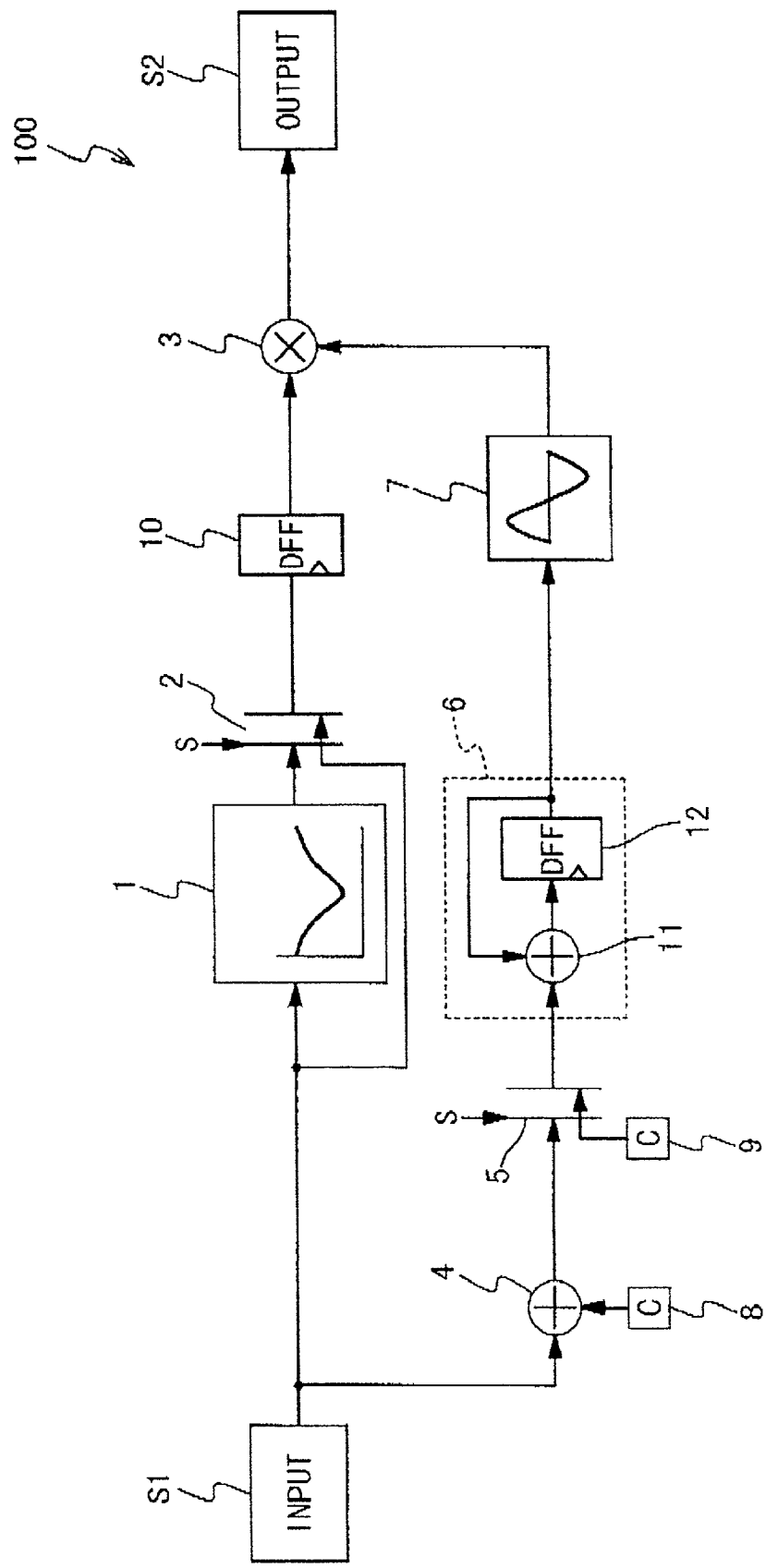
FIG. 1 is a conceptual view showing a video signal processing circuit of the present invention.

FIG. 1 is a conceptual view showing a video signal processing circuit of the present invention. A video signal processing circuit 100 shown In FIG. 1 is provided with a bell table 1, a first switch 2, a multiplier 3, an adder 4, a second switch 5, a loop counter 6, a sine ROM 7 and a flip-flop 10. The loop counter 6 has a counting adder 11 and a flip-flop 12. The loop counter 6 and the sine ROM 7 constitute a carrier generator according to the present invention.

An input signal (Input) S1 and a first constant (C) 8 are sent to the adder 4. An output of the adder 4 and a second constant (C) 9 are sent to the second switch 5. The input signal S1 is sent to the bell table 1 and the adder 4. An output of the bell table 1 and the input signal S1 are sent to the first switch 2.

An output of the first switch 2 is sent through the flip-flop 10 to the multiplier 3. An output of the second switch 5 is sent to the loop counter.6. An output of the loop counter 6 is sent through the sine ROM 7 to the multiplier 3. The multiplier 3 outputs an output signal (Output) S2.

The bell table 1 carries out a bell property process to the color difference signal S1 of the SECAM Standard. The first switch 2 carries out a selection between the input signal S1 and an output (first input) of the bell table 1, on the basis of a selection signal S. The adder 4 carries out an addition of the input signal S1 and the first constant 8. The second switch 5 carries out a selection between an output (third input) of the adder 4 and a constant 9 (fourth input), on the basis of the selection signal S. The loop counter 6 counts the output of the second switch 5. The sine ROM 7 carries out a sine process to an output signal of the loop counter 6. The multiplier 3 calculates the output of the first switch 2 and an output of the sine ROM 7. The multiplier 3 outputs the output signal S2.

The video signal processing circuit 100 receives any of a color difference signal of the PAL Standard, a color difference signal of the NTSC Standard and a color difference signal of the SECAM Standard. If the video signal processing circuit 100 receives the color difference signal of the PAL Standard (or the color difference signal of the NTSC Standard) (a first operation state), the first switch 2 selects the second input. Similarly, the second switch 5 selects the second input. If the video signal processing circuit 100 receives the color difference signal of the SECAM Standard (a second operation state), the first switch 2 selects the first input. Similarly, the second switch 5 selects the first input.

The bell table 1 has a ROM table in which a bell property is recorded. The ROM table has a function of changing a reference position on the basis of an input signal and outputting a data stored in the referred position as an output signal. A level of a color difference signal represented by, for example, a 9-bit data is inputted to an input side of the ROM table, namely, an address input. The 9-bit data enables a modulation frequency correlated to the level of the color difference signal based on the standard of the SECAM Standard to be represented as a frequency deviation of 512 stages (−256 to +255). An output side of the ROM table, namely, an output data is represented by, for example, an 8-bit data. The 8-bit data enables a representation of an amplitude accuracy of 256 stages (0 to 255). In this case, a capacity of 512 words ×8 bits is set for the ROM table. The action of the bell filter implies a deviation in an output amplitude corresponding to the input frequency and the bell property. Such an action is equal to an action for further performing an amplitude modulation on a signal after an execution of a frequency modulation correspondingly to the bell property. This ROM table is designed such that when receiving a value (address) corresponding to a certain frequency, it outputs an amplitude which corresponds to that frequency and has the level property. That is, in the ROM table, the data (output data) prior to the frequency modulation is recorded in advance in a predetermined address position (frequency value). This ROM table is designed such that the frequency and the amplitude are correlated to each other in a one-to-one relation. Thus, it is not necessary to include a large complex logical configuration such as the FIR filter.

Here, the first operation state (the PAL and NTSC Standards) and the second operation state (the SECAM Standard) according to the present invention are described with reference to FIGS. 2, 3.

Figure 2:
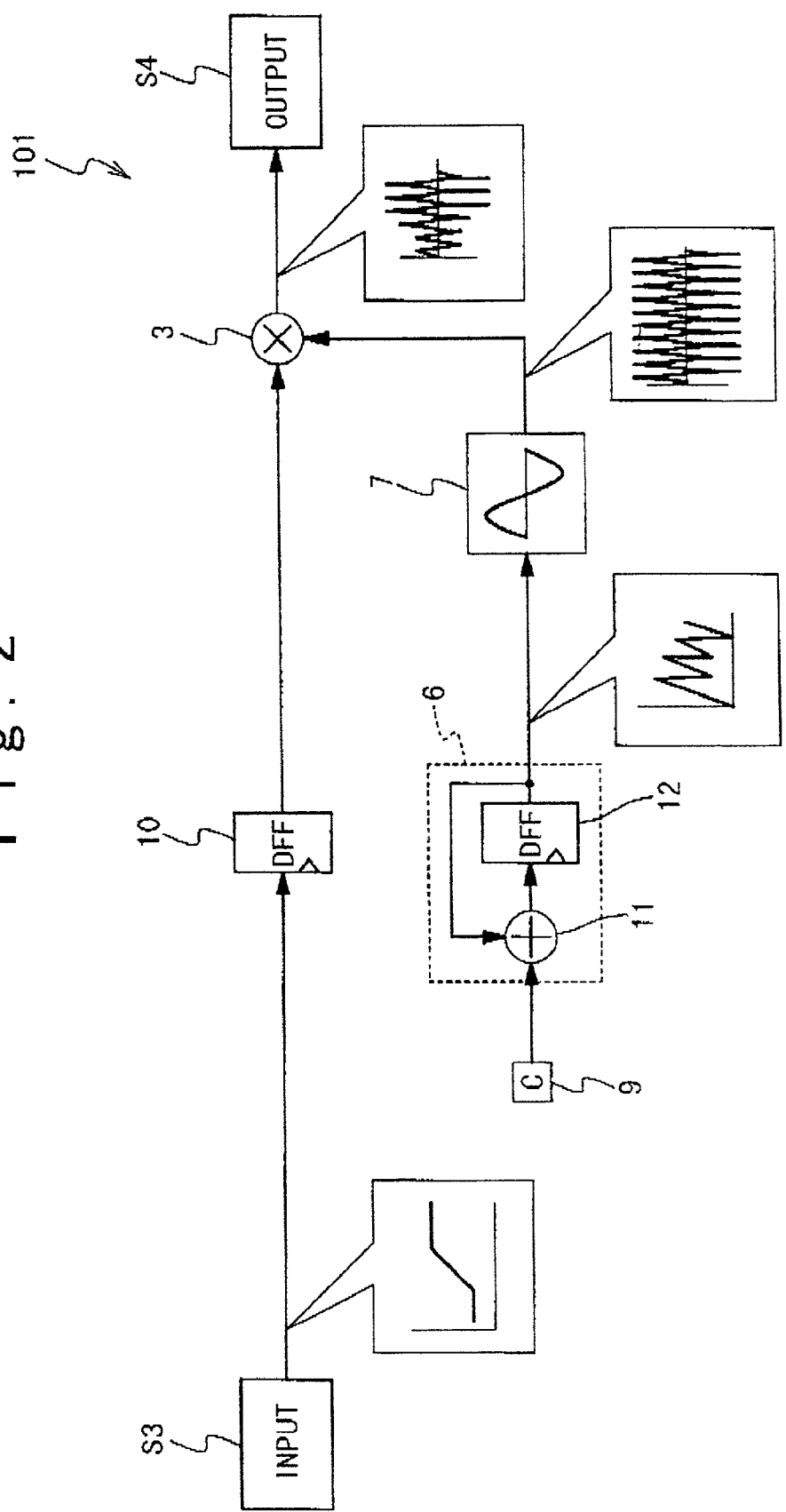
FIG. 2 is a conceptual view showing a first operation state according to the present invention.

FIG. 2 is a conceptual view of the first operation state according to the present invention. A video signal processing circuit 101 shown in FIG. 2 has the multiplier 3, the loop counter 6 and the sine ROM 7 in the video signal processing circuit 100 shown in FIG. 1. The video signal processing circuit 101 further includes the flip-flop 10. This flip-flop 10 is installed so as to receive an input stage of the color difference signal of the PAL Standard, namely, an input signal S3.

In the above-mentioned configuration, the color difference signal of the PAL Standard is inputted through the flip-flop 10 to the multiplier 3. On the other hand, a second constant 9 is sent to the loop, counter 6. An output of the loop counter 6 is converted through the sine ROM 7 into a carrier signal, and sent to the multiplier 3. In the multiplier 3, the modulation is carried out correspondingly to the color difference signal of the PAL Standard. The multiplier 3 outputs an output signal S4 that is the modulated color difference signal of the PAL Standard.

Figure 3:
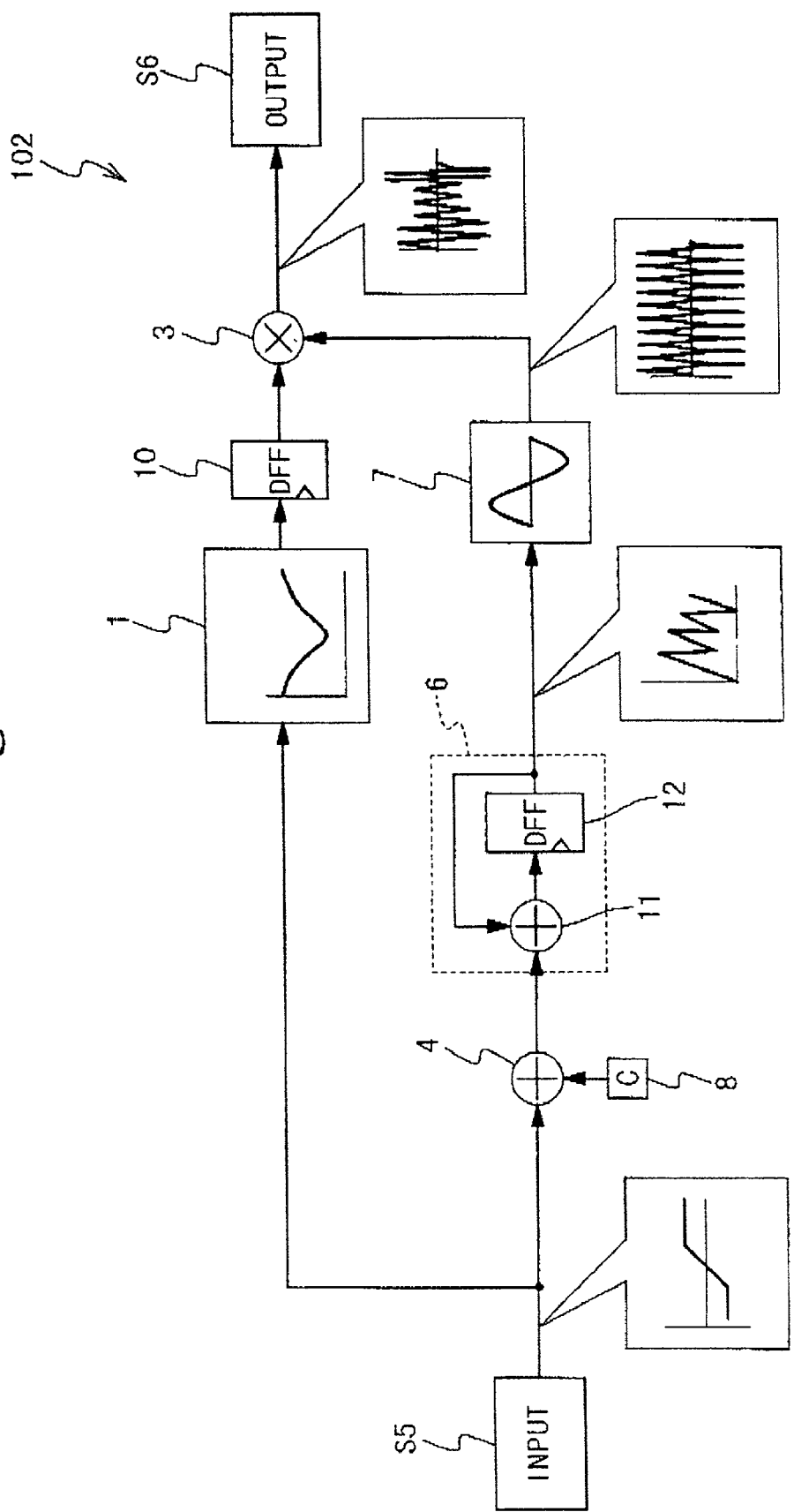
FIG. 3 is a conceptual view showing a second operation state according to the present invention.

FIG. 3 is a conceptual view of the second operation state according to the present invention. A video signal processing circuit 102 shown in FIG. 3 has the bell table 1, the multiplier 3, the loop counter 6 and the sine ROM 7 in the video signal processing circuit 100 shown in FIG. 1. The video signal processing circuit 102 further includes the flip-flop 10.

In the above-mentioned configuration, an input signal S5, namely, a color difference signal of the SECAM Standard is inputted to the bell table 1. An output of the bell table 1 is inputted through the flip-flop 10 to the multiplier 3. On the other hand, the color difference signal of the SECAM Standard is inputted to the adder 4. The adder 4 adds the color difference signal of the SECAM Standard to a first constant 8. An output of the adder 4 is inputted to the loop counter 6. An output of the loop counter 6 is converted through the sine ROM 7 into a carrier signal and sent to the multiplier 3. The multiplier 3 carries out a multiplication of the color difference signal of the SECAM Standard having the bell property and the carrier signal, namely, a modulation. The multiplier 3 outputs an output signal S6 that is the modulated color difference signal of the SECAM Standard.

The video signal processing circuit according to the present invention can generate a color difference modulation signal corresponding to each type, since the multiplier 3 calculates an output of a first controller for selecting and outputting any one of an output signal (the SECAM Standard) of an amplitude having a bell property for a level of an input color difference signal and an output signal (the PAL Standard or the NTSC Standard) having an amplitude proportional to the level of the input signal, and an output of a second controller for selecting and outputting any one of a carrier signal (the SECAM Standard) of a frequency corresponding to the level of the input color difference signal and a carrier signal (the PAL Standard or the NTSC Standard) of a constant frequency independent on the level of the input color difference signal. In accordance with the selection signal S for selecting any one of the SECAM Standard and the PAL/NTSC Standard, each of the first and second controllers outputs any one output to the multiplier 3. In this way, the color difference modulation signal adapted to the respective SECAM, PAL and NTSC Standards can be generated for the color difference signal that is the input signal, if there are one first controller for controlling the amplitude thereof, one second controller for generating the targeted carrier signal on the basis of the amplitude of the input signal and one multiplier for multiplying the outputs of those controllers. Moreover, in the video signal processing circuit for performing the modulation of the carrier signal and the amplitude on the input base band signal, it is possible to attain the video signal processing circuit including: an amplitude controller for correcting the amplitude of the base band signal; a carrier signal generator for generating the carrier signal of the base band signal; a calculation processor for calculating the outputs of the amplitude controller and the carrier signal generator and modulating the carrier signal; and a controller for controlling an amplitude value in the amplitude controller and a frequency of the carrier signal in the carrier signal generator. Accordingly, when the amplitude modulation or the frequency modulation is performed on the base band signal, it is possible to generate the modulation signal having any amplitude and any frequency.

Figure 4:
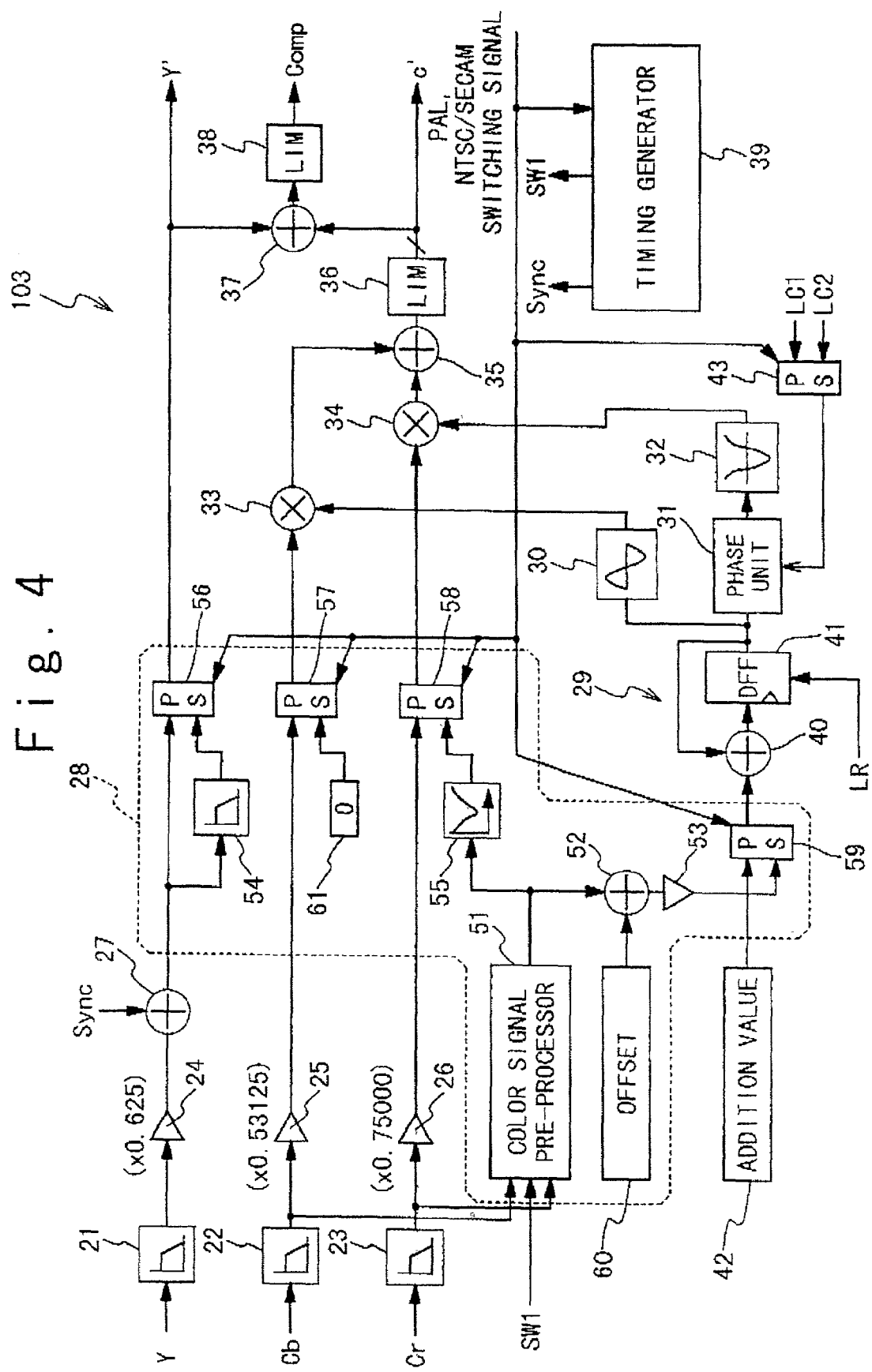
FIG. 4 is a view showing a configuration of a video signal processing circuit according to the present invention.

The actual configuration of the video signal processing circuit according to the present invention will be described below with reference to FIG. 4. FIG. 4 is a view showing the configuration of the video signal processing circuit according to the present invention. A video signal processing circuit 103 shown in FIG. 4 has the configuration varied in such a way that the video signal processing circuit corresponding to the PAL/NTSC Standard can be applied to the SECAM Standard. The video signal processing circuit 103 shown in FIG. 4 is provided with low pass filters 21 to 23, coefficient units 24 to 26, a first adder 27, a SECAM corresponding circuit 28, a loop counter 29, a sine ROM 30, a phase unit (for the PAL Standard) 31, a cosine ROM 32, first and second multipliers 33, 34, a second adder 35, limiters 36, 38, an adder 37, a timing generator 39 and a selector 43. The loop counter 29 has the adder 40 and the flip-flop 41. The SECAM corresponding circuit 28 has a color signal pre-processor 51, an adder 52, a coefficient unit 53, a trap filter 54, a bell table 55 and selectors 56 to 59.

Input stages of the low pass filters 21 to 23 are set at, for example, 10 bits complying with an ITU-R BT.601 standard. When a system coupled to a former stage corresponds to 8 bits, 0 is added to two bits of the lower order to thereby generate a 10-bit data. An output stage of the color signal pre-processor 51 is set at, for example, 9 bits. An offset addition value indicates, for example, a value of 12 bits. The coefficient unit 53 executes a shift operation of 14 bits (26-bit output). The selector 59 receives, for example, a 26-bit data. The sine ROM 30 and the phase unit 31 receive, for example, 10 bits of the lower order in the 26-bit input. A first line change signal LC1 (010101 . . . ) and a second line change signal LC2 (001001 . . . ) are sent through the selector 43 to the phase unit 31.

A Y signal is sent to the low pass filter 21. A Cb signal (B-Y signal) is sent to the low pass filter 22. A Cr signal (R-Y signal) is sent to the low pass filter 23. An offset value (for the SECAM Standard) 60 is sent to the adder 52. The addition value (for the PAL Standard and the NTSC Standard) 42 is sent to a first input of the adder 52. A fixed value 61 is sent to a second input of the selector 57. The timing generator 39 outputs a synchronization signal Sync and a switching signal SW1. The synchronization signal Sync sets an operation timing of the video signal processing circuit 103. The switching signal SW1 sets a signal to be received by the color signal pre-processor 51, namely, a switch timing between the Cb signal and the Cr signal. The timing generator 39 receives a switching signal for executing a switching control of the selectors 43 and 56 to 59. If the timing generator 39 executes the signal process for the PAL Standard and the NTSC Standard, the selectors 43 and 56 to 59 are switched and controlled so as to select a first input (P). If the timing generator 39 executes the signal process for the SECAM Standard, the selectors 43 and 56 to 59 are switched and controlled so as to select a second input (S).

In the low pass filters 21 to 23, a band is limited to 1.5 MHz or less. The coefficient unit 24 executes a multiplication of a coefficient of 0.625. The coefficient unit 25 executes a multiplication of a coefficient of 0.53125. And, the coefficient unit 26 executes a multiplication of a coefficient of 0.75.

In the video signal processing circuit 103 having the above-mentioned configuration, a Y' signal is outputted from the selector 56. A composite signal Comp is outputted from the limiter 38. A C' signal is outputted from the limiter 36. The bell table 55 corresponds to the bell table 1 illustrated in FIG. 3.

As a peripheral circuit of the video signal processing circuit 103, a carrier aligning unit (unit A) for each scanning line and an FM carrier inverting unit (unit B) for 3H are required for the SECAM Standard, and a SECAM ID signal inserting unit and a color burst signal inserting unit are required for the PAL Standard. By the way, the two units for the PAL Standard are not important in the present invention. So, the detailed explanation is omitted.

Figure 6A:
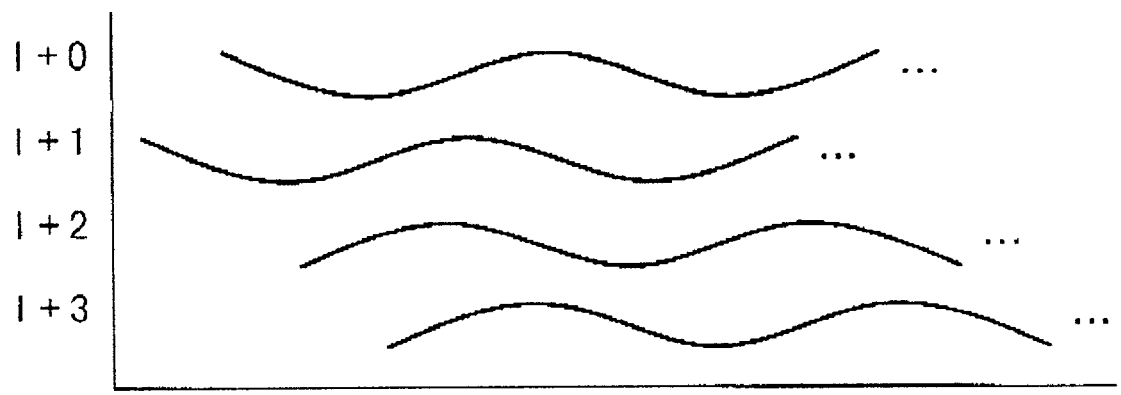
FIG. 6A is a view explaining a first operation in a peripheral circuit according to the present invention.
Figure 6B:
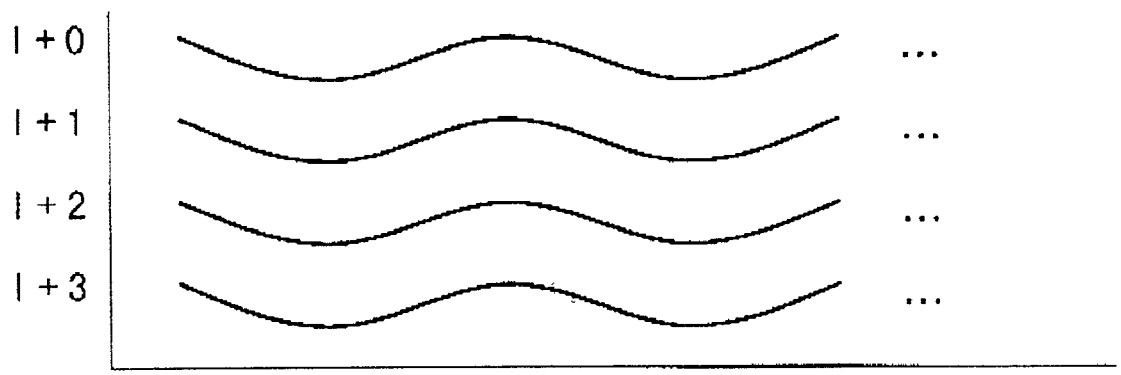
FIG. 6B is another view explaining a first operation in a peripheral circuit according to the present invention.
Figure 6C:
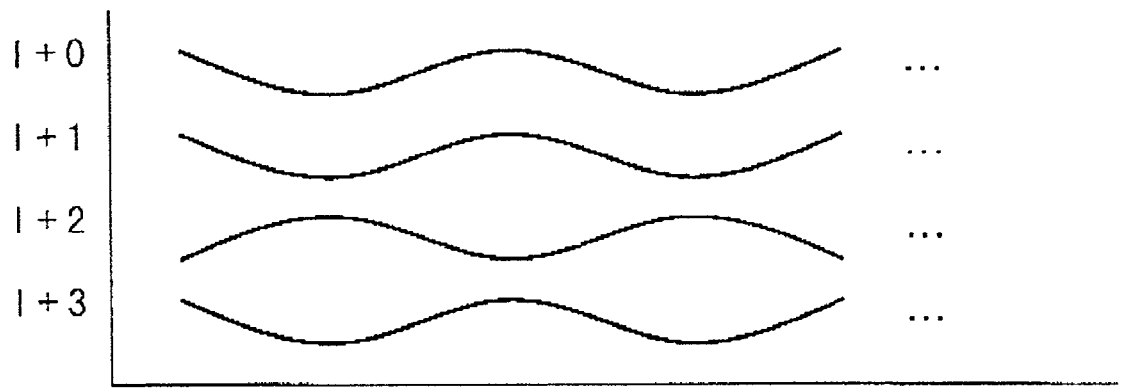
FIG. 6C is still another view explaining a first operation in a peripheral circuit according to the present invention.
Figure 7:
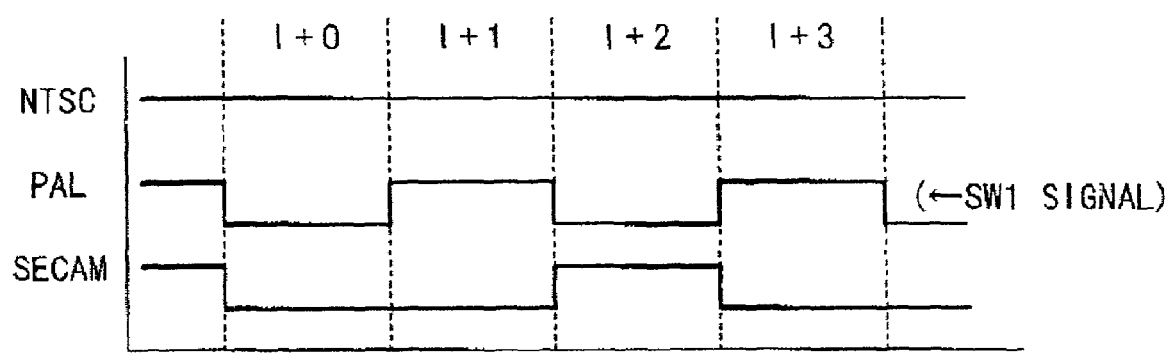
FIG. 7 is a view explaining a second operation in a peripheral circuit according to the present invention.
Figure 8:
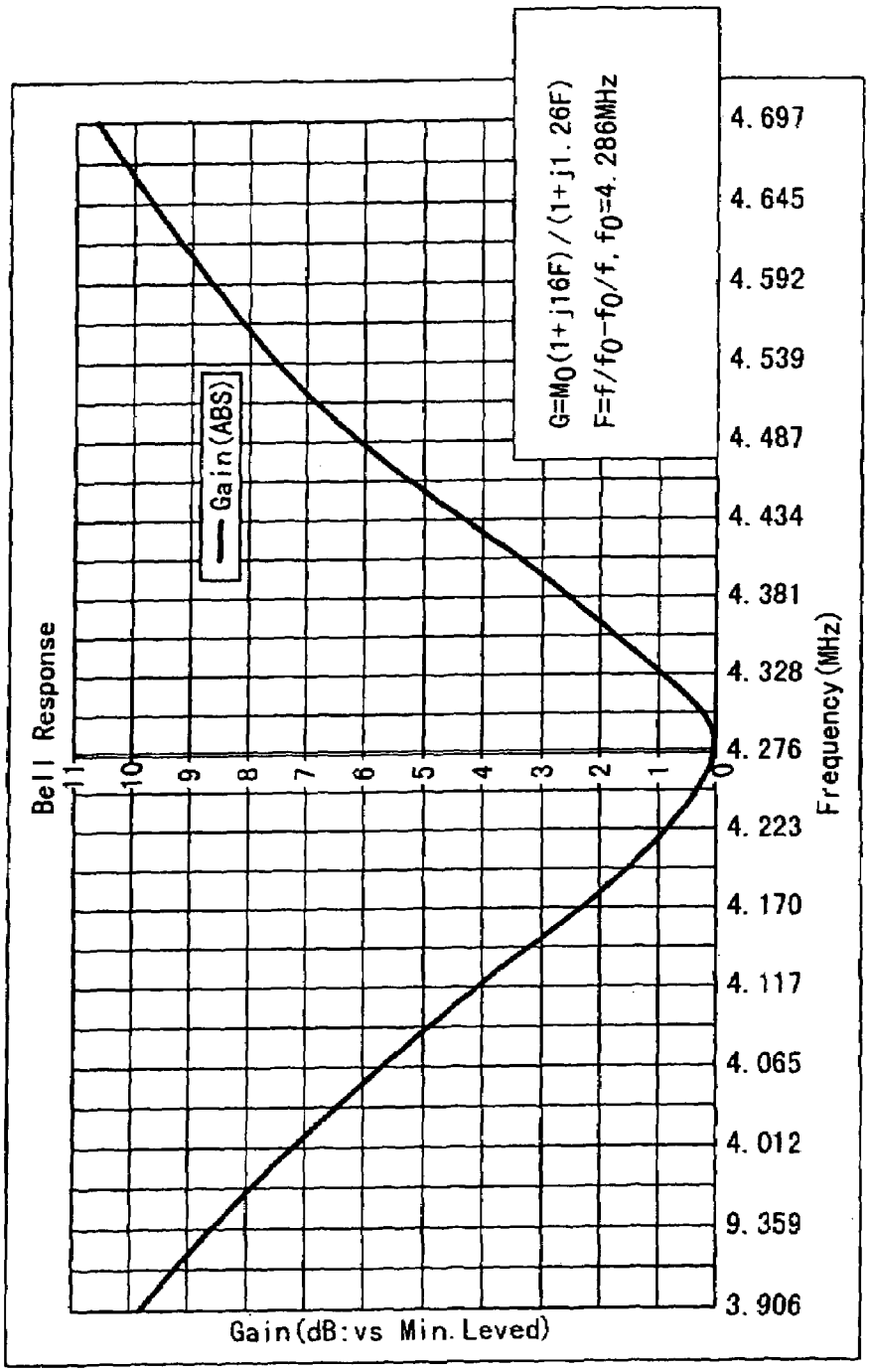
FIG. 8 is a characteristic graph of a bell filter.
Figure 9:
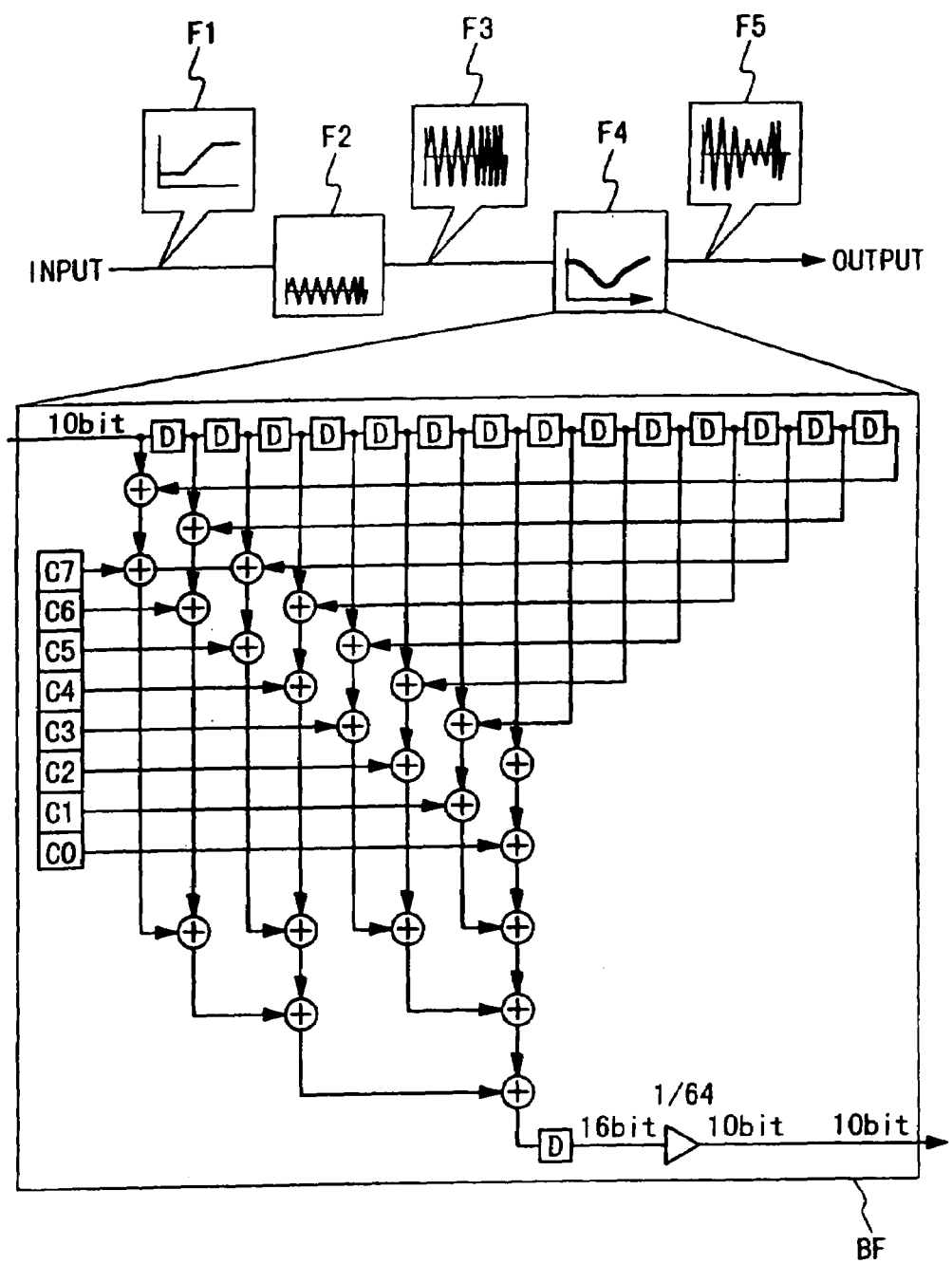
FIG. 9 is a view showing a configuration of a bell filter.

Here, the units A, B are described with reference to FIGS. 6A to 6C and 7. FIGS. 6A to 6C are views explaining a first operation in the peripheral circuit according to the present invention. FIG. 7 is a view explaining a second operation in the peripheral circuit according to the present invention. The units A, B are the important units in finally generating the color difference modulation signal of the SECAM Standard. If a loop counter for generating the carrier signal of the color difference signal in the PAL or NTSC Standard is diverted, FIGS. 6A to 6C are the views explaining the first operation in the peripheral circuit according to the present invention. In FIGS. 6A to 6C, a horizontal axis indicates a time, and a vertical axis indicates an order of the scanning lines. FIG. 6A shows a phase of the carrier signal for each scanning line. If a line reset of the flip-flop 41 (an input of LR) is not executed, the generation of an FM carrier in the color difference modulation signal is disturbed as shown in FIG. 6A since the flip-flop 41 is not free run (always counted up).

In order to generate the precise SECAM signal, as shown in FIG. 6B, it is necessary to align the carriers at a lead (a portion having no color signal) of each scanning line (FIG. 6B) and further inverting them one time for each three lines. The alignment shown in FIG. 6B is attained, by sending the line reset signal LR to the flip-flop 41. The inversion on a line I+2 shown in FIG. 6C is attained by sending, the line change signal LC2 to the phase unit 31.

As shown in FIG. 7, a signal 001001 . . . is sent to the phase unit 31 if it corresponds to the SECAM Standard. Similarly, a signal 000000 . . . is sent if it corresponds to the NTSC Standard, and a signal 010101 . . . is sent if it corresponds to the PAL Standard.

Figure 5:
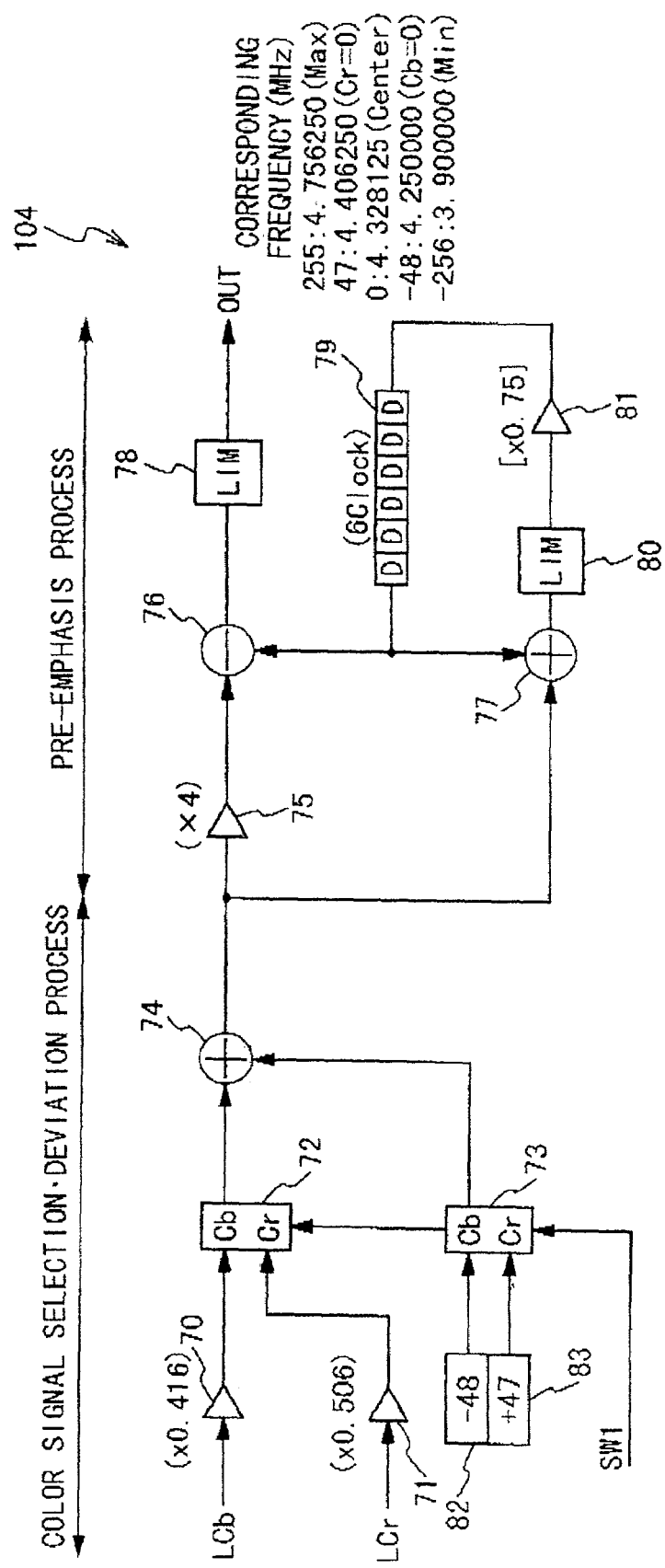
FIG. 5 is a view showing a configuration of a color signal processor according to the present invention.

Here, the configuration of the color signal pre-processor according to the present invention is described with reference to FIG. 5. FIG. 5 is the view showing the configuration of a color signal processor according to the present invention. A color signal processing circuit 104 (denoted by 51 of FIG. 4) includes coefficient units 70, 71, selectors 72, 73. an adder 74. a coefficient unit 75, a subtracter 76, an adder 77, a limiter 78, a delaying unit 79, a limiter 80 and a coefficient unit 81.

The coefficient unit 70 executes a multiplication of a coefficient of 0.416. The coefficient unit 71 executes a multiplication of a coefficient of 0.506. The coefficient unit 75 executes a multiplication of a coefficient of 4. And, the coefficient unit 81 executes a multiplication of a coefficient of 0.75.

A 10-bit data is transmitted up to an input stage of the coefficient unit 75 from input stages of the coefficient units 70, 71. A 12-bit data is transmitted up to an output stage of the delaying unit 79 from an output stage of the coefficient unit 75 and an output stage of the limiter 80. A 13-bit data is transmitted to an output stage of the subtracter 76 and an output stage of the adder 77. And, a 9-bit data is transmitted to an output stage of the limiter 78.

A fixed value of 82 (−48) and a fixed value of 83 (+47) are sent to the selector 73. The selector 73 executes the switching control based on the switching signal SW1 (shown in FIG. 4), This switching signal SWI is set such that a signal LCb or a signal LCr is selected for each line. The signal LCb and the signal LCr imply the signals outputted from the low pass filters 22, 23.

The signal LCb and the signal LCr represented by the 10 bits of the base band whose band is limited to 1.5 MHz and the switching signal SWI are inputted to this circuit. The coefficient units 70, 71 perform the coefficient processes on the signal LCb and the signal LCr, respectively. The coefficients in the coefficient units 70, 71 are set by considering the deviation range in the SECAM Standard corresponding to the 10-bit signal in accordance with RE601.

Next, the selectors 72, 73 select the signals. The selections are executed to correspond to a line sequence transmission of a color (only one of the signals Cb and Cr is selected on each scanning line) that is the feature of the SECAM Standard. In the selections, the timing generator 39 uses a signal for repeating a switching of H/L for each scanning line.

By the way, in the SECAM Standard, if the frequency modulation is performed on the color signal, it is necessary to change central frequencies on the sides of the signals Cb, Cr. A central frequency of 4.250000 MHz is set for the side of the signal Cb. A central frequency of 4.406250 MHz is set for the side of the signal Cr. In the present invention, the fixed values 82, 83 are sent to the selector 73 to then change the central frequencies. If the process with regard to the signal Cb is executed, the fixed value 82 is selected. If the process with regard to the signal Cr is executed, the fixed value 83 is selected.

The signal process of the SECAM Standard requires a pre-emphasis process. The pre-emphasis process implies the process for performing a sharp transient on the signal. This process is executed by a processing loop (an IIR filter) composed of the adder 77, the limiter 80, the coefficient unit 81 and the delaying unit 79. The subtracter 76 performs a subtracting process on an output of the delaying unit 79.

The output of the subtracter 76 is limited, to a 9-bit signal of a 2's complement in the limiter 78. An output signal Out indicates a range between −256 and +255. This value corresponds to a frequency between 3.900000 and 4.756250 MHz in terms of the frequency range of the SECAM Standard. This value falls In the band of the color difference signal of the SECAM Standard when the fixed values 82, 83 are considered. The output signal Out is used in the frequency modulating process and the bell property in a, later stage.

Here, the ground of the coefficients of the coefficient units 70, 71 is described. A modulation range of SECAM Db/Dr in a 75% color bar is defined as (Db:±230 kHz, Dr:+280 kHz). When an operation frequency of a circuit represents the 75% color bar in a 14-bit loop counter of 27 MHz, a change amount (on one side) of data inputted to the loop counter is given by:

$Db$ Side: $2^{14} \times \Delta 230$ (kHz)/27 (MHz)=139.567(About 140)

$Dr$ Side: $2^{14} \times \Delta 280$ (kHz)/27 (MHz)=169.908(About 170)

On the other hand, a color when the Cb is minimum in the color bar is yellow, and a color when the Cr is minimum is cyan. When a format of the Cb/Cr input signal corresponds to the ITU-R BT.601, they are represented by;

$Cb$ Input of 75% Yellow(8 Bit):44LSB=[−84]+128

$Cr$ Input of 75% Yellow(10 Bit):176LSB=[−336]+512

$Cb$ Input of 75% Red(8 Bit):44LSB=[−84]+128

$Cr$ Input of 75% Red(10 Bit):176LSB=[−336]+512

(However, a value in [ ] indicates a deviation amount from 0 except an offset).

Thus, it is established such that when each of the Cb/Cr inputs is [−336]+512, the deviation amounts indicate +140 and −170, respectively. For this reason, the coefficients set for the two coefficient units, namely, the gains are as follows:

Cain on $Cb$ Side:+140/336=+0.416

Gain on $Cr$ Side:−170/336=−0.506

The concept of the addition value in the loop counter will be described below. As the standard frequency (kHz) in the SECAM Standard, a minimum frequency is 0.000, a minimum frequency of a deviation is 3900.000 (an allowable error of ±18.000), foB:Db (B-Y) standard frequency is 4250.000 (an allowable error of +2.000), a central frequency of a deviation is 4328.125, foR Dr (R-Y) standard frequency is 4406.000 (an allowable error of +2.000), and a maximum frequency of a deviation is 4756.250 (an allowable error of ±18.000).

A minimum value of a frequency count value corresponding to the standard in the loop counter is 0, and a maximum value thereof is 4095. By the way, a maximum frequency that can be represented by the loop counter is 6750.000 kHz (a count value of 4095).

A value (count value) corresponding to the central frequency of the standard in the loop counter is set at 2626 (4328.125 kHz). The minimum frequency of the deviation is represented by: 2626−256=2370 (3905.640 kHz). The maximum frequency of the deviation is represented by 2626+255=2881 (4747.742 kHz), The foB is represented by 2626−48= 2578 (4248.413 kHz), and the foR is represented by 2626+47=2673 (4404.968 kHz). By the way, the values (−48), (+47) sent to the loop counter imply the fixed values 82, 83.

By the way, errors of the frequencies generated correspondingly to the count values of the loop counter are +5.639 in the case of the minimum frequency of the deviation, −1.586 in the case of the foB, −1.281 in the case of the foR, and −8.508 in the case of the maximum frequency of the deviation. All of the errors fall in the allowable ranges.

By the way, if an operation frequency of a digital oscillator is set to 27 MHz, a representable frequency is in a range between 0 and 13.5 MHz in accordance with the Nyquist's theorem. If a bit width of a loop counter of the digital oscillator is set to 14 blts, an addable range of the loop counter is in a range between 0 and $2^{(13-1)}$=8191 levels, namely, it indicates a 13-bit width. The range required In the actual input signal process is below 6 MHz. Thus, the range of the added value is in a range between 0 and $2^{(12-1)}$=4095 levels, namely, it can be set at a 12-bit width. A frequency accuracy is 27 MHz/$2^{14}$ level= 1.648 kHz level. In a case of lack of gradation, there is a method of executing an increment by simply increasing the number of bits in the loop counter or using a counter (DDA) to represent a fraction or. In the embodiment of the present invention, it is possible to sufficiently satisfy the standard of the color signal in the SECAM Standard by setting the addition value as mentioned above.

As mentioned above, the video signal processing circuit according to the present Invention can change the signal transmission route in accordance with the standard of the input video signal, namely, on the basis of the SECAM Standard, the PAL Standard and the NTSC Standard, and suitably carry out the correspondence. Thus, it is possible to attain both the common usage of the circuit and the correspondence to the plurality of types.

In the embodiment, the amplitude of the base band signal (color difference signal) is changed depending on the type. Thus, any of the color difference signals inputted or outputted from the ROM table is selected by the switch 2. This control, namely, the control of the relation between the input amplitude and the output amplitude of the color difference signal can be applied besides the switching of the output through the switch. A necessary circuit is a control circuit for varying a correction amount of an amplitude of an output signal with respect to an amplitude of an input signal. Also, on the basis of the amplitude of the color difference signal, the frequency selection of the carrier signal for modulating the color difference signal is selected by the switch 5. However, this may be similarly selected by a control circuit for varying a frequency setting of a carrier signal with respect to the amplitude of the input signal. Then, it is possible to carry out any modulation by using a control circuit for carrying out a control so as to output the targeted amplitude correction amount and carrier frequency, to both the control circuits.

The video signal processing circuit according to the present invention can be applied to an apparatus besides the set top box in which the broadcast signal wave is converted into the SECAM Standard, the PAL Standard or the NTSC Standard, and the signal is sent to the television receiver corresponding to those types.

For example, it can be installed in a reproducing unit of a picture recording/reproducing apparatus, such as a DVD video recorder and the like. In this case, the reproduction can be done by using the same type as the type at a time of a recording operation (the SECAM Standard, the PAL Standard and the NTSC Standard) or the different type.

In the video signal processing circuit according to the present invention, the control signal for executing the setting of the signal type to be processed (reproduced), namely, the setting of the first and second switches 2, 5 is generated by referring to the type signal, for example, if the broadcast wave includes the type signal for specifying the type (the standard code for specifying the SECAM Standard, the PAL Standard and the NTSC Standard, the broadcast area code and the like). Moreover, this control signal can be also generated by referring to the setting information set as a hardware or a software by a user operating the set top box or the picture recording/reproducing apparatus.

The video signal processing circuit according to the present invention can provide the video signal processing circuit which can correspond to any of the PAL Standard, the NTSC Standard and the SECAM Standard and does not require the high order digital filter.

The present application claims priority under 35 U.S.C. §119 to Japanese Patent Application No. 2000-378109, filed at day of Dec. 12, 2000, entitled " video signal processing circuit". The contents of that application are incorporated herein by reference in their entirety.

What is claimed is:

1. A video signal processing circuit, comprising:
a bell table configured to input a color difference signal to output a modulation signal having an amplitude defined by the SECAM Standard of said color difference signal;
a first switch configured to select one of said color difference signal and said modulation signal to output a first signal;
a carrier generating unit configured to output one of a carrier signal having a frequency defined by the SECAM Standard of said color difference signal and a carrier signal having frequency defined by the PAL Standard and/or the NTSC Standard as a second signal; and
a calculation processing unit calculating said first and second signals to output a color difference modulation signal.

2. The video signal processing circuit according to claim 1, wherein said carrier generating unit includes a loop counter and a sine ROM.

3. The video signal processing circuit according to claim 2, wherein said loop counter is reset at a start point of a scanning line in response to a line reset signal.

4. The video signal processing circuit according to claim 2, wherein said carrier generating unit includes a phase unit, and
wherein said phase unit inverts an output of said loop counter every three scanning lines, when said color difference modulation signal of the SECAM Standard is generated.

5. The video signal processing circuit according to claim 3, wherein said carrier generating unit includes a phase unit, and
wherein said phase unit inverts an output of said loop counter every three scanning lines, when said color difference modulation signal of the SECAM Standard is generated.

6. The video signal processing circuit according to claim 1, wherein said bell table stores frequency data corresponding to said frequency of said carrier signal defined by the SECAM Standard of said color difference signal and amplitude data corresponding to said amplitude of said color difference modulation signal of the SECAM Standard.

7. The video signal processing circuit according to claim 2, wherein said bell table stores frequency data corresponding to said frequency of said carrier signal defined by the SECAM Standard of said color difference signal and amplitude data corresponding to said amplitude of said color difference modulation signal of the SECAM Standard.

8. The video signal processing circuit according to claim 3, wherein said bell table stores frequency data corresponding to said frequency of said carrier signal defined by the SECAM Standard of said color difference signal and amplitude data corresponding to said amplitude of said color difference modulation signal of the SECAM Standard.

9. The video signal processing circuit according to claim 2, wherein an operational frequency of said ioop counter is set to be equal to an integer multiple of 13.5 MHz or 13.5 MHz.

10. The video signal processing circuit according to claim 1, further comprising:
a color signal pre-processing unit generating a deviation signal indicative of a frequency deviation of the SECAM Standard from the (R-Y) signal and the (B-Y) signal included in an input signal of the SECAM Standard inputted in said bell table and said carrier generating unit, and
wherein when said (R-Y) signal and said (B-Y) signal are based on the ITU-BT.601 standard, said color signal pre-processing unit performs a multiplication of 0.416 times on said (R-Y) signal and a multiplication of −0.506 times on said (B-Y) signal and an offset setting on said (R-Y) signal and said (B-Y) signal.

11. The video signal processing circuit according to claim 2, further comprising:
a color signal pre-processing unit generating a deviation signal indicative of a frequency deviation of the SECAM Standard from the (R-Y) signal and the (B-Y) signal included in an input signal of the SECAM Standard inputted in said bell table and said carrier generating unit, and
wherein when said (R-Y) signal and said (B-Y) signal are based on the ITU-BT.601 standard, said color signal pre-processing unit performs a multiplication of 0.416 times on said (R-Y) signal and a multiplication of −0.506 times on said (B-Y) signal and an offset setting on said (R-Y) signal and said (B-Y) signal.

12. The video signal processing circuit according to claim 3, further comprising:
a color signal pre-processing unit generating a deviation signal indicative of a frequency deviation of the SECAM Standard from the (R-Y) signal and the (B-Y) signal included in an input signal of the SECAM Standard inputted in said bell table and said carrier generating unit, and
wherein when said (R-Y) signal and said (B-Y) signal are based on the ITU-BT.601 standard, said color signal pre-processing unit performs a multiplication of 0.416 times on said (R-Y) signal and a multiplication of −0.506 times on said (B-Y) signal and an offset setting on said (R-Y) signal and said (B-Y) signal.

13. The video signal processing circuit according to claim 4, further comprising:

a color signal pre-processing unit generating a deviation signal indicative of a frequency deviation of the SECAM Standard from the (R-Y) signal and the (B-Y) signal included in an input signal of the SECAM Standard inputted in said bell table and said carrier generating unit, and wherein when said (R-Y) signal and said (B-Y) signal are based on the ITU-BT.601 standard, said color signal pre-processing unit performs a multiplication of 0.416 times on said (R-Y) signal and a multiplication of −0.506 times on said (B-Y) signal and an offset setting on said (R-Y) signal and said (B-Y) signal.

14. The video signal processing circuit according to claim 1, wherein a data width on an input side of said bell table is set to be equal to or greater than 8 bits, and a data width on an output side of said bell table is set to be equal to or greater than 8 bits.

15. A video signal processing circuit comprising:

an input section which inputs one of a plurality of signals whose types are different from each other;

an amplitude control unit configured to control an amplitude of the inputted signal when the inputted signal is a specific signal;

a carrier signal generating unit configured to control generation of a carrier signal having a frequency corresponding to the inputted signal;

a modulator configured to modulate the inputted signal by using said carrier signal; and a type selector controlling a correspondence setting of said amplitude in said amplitude control unit and a correspondence setting of said frequency in said carrier signal generating unit;

wherein said carrier generating unit includes a loop counter and a sine ROM.

16. The video signal processing circuit according to claim 15, wherein said loop counter is reset at a start point of a scanning line in response to a line reset signal.

17. The video signal processing circuit according to claim 15, wherein said carrier generating unit includes a phase unit which inverts an output of said loop counter every three scanning lines, when the input signal is said specific signal.

18. The video signal processing circuit according to claim 15, wherein said plurality of signals are color difference signals.

19. The video signal processing circuit according to claim 18, wherein said amplitude control unit includes a bell table which stores amplitude data corresponding to an amplitude of a color difference modulation signal defined by the SECAM Standard of said color difference signal and frequency data corresponding to a frequency of a carrier signal defined by the SECAM Standard of said color difference signal, said amplitude control unit controlling the amplitude of the inputted signal when the inputted signal is a SECAM signal by using said bell table.

* * * * *